350-377 SR

XR 3,716,847

United Stat[es Patent] [11] 3,716,847

Valin [45] Feb. 13, 1973

[54] MIRROR UTILIZED IN MAGNETO-OPTICAL READOUT SYSTEM TO ELIMINATE FRESNEL EFFECT

[75] Inventor: Jean Valin, 78 - Les Essarts Le Roi, France

[73] Assignee: Compagnie Internationale pour L'Informatique, Louveciennes, France

[22] Filed: May 24, 1971

[21] Appl. No.: 146,188

[30] Foreign Application Priority Data

June 10, 1970 France.........................7021267

[52] U.S. Cl. ..........................340/174 YC, 350/151

[51] Int. Cl.........................G11c 11/42, G11c 11/14

[58] Field of Search................340/174 YC, 174.1 M; 179/100.2 CH; 350/151

[56] References Cited

UNITED STATES PATENTS 3,284,785 11/1966 Kornei.........................340/174.1 M 3,445,833 5/1969 Lins.............................340/174 YC

*Primary Examiner*—Vincent P. Canney

*Attorney*—Kemon, Palmer, Stewart and Estabrook

[57] ABSTRACT

A metallic ferromagnetic layer recording binary bit information is read-out by a device utilizing the Kerr effect. A metallic reflector mirror is provided upstream of the layer and its magnetic material is saturated along one at least of the directions of magnetization significant of one of the binary values of the bit memory points in said layer.

11 Claims, 5 Drawing Figures

3716847
OR IN 365/122

INVENTOR

JEAN VALIN

Kemon, Palmer & Estabrook

ATTORNEYS

INVENTOR
JEAN VALIN
Kemon, Palmer & Estabrook
ATTORNEYS

MIRROR UTILIZED IN MAGNETO-OPTICAL READOUT SYSTEM TO ELIMINATE FRESNEL EFFECT

BRIEF SUMMARY OF THE INVENTION

The present invention concerns improvements in or relating to magnetic recording stores of the kind wherein a metallic ferromagnetic layer is recorded with binary information bits each occupying a magnetic field and the orientations of the magnetization are reversed according whether a digit "1" or a digit "0" is recorded.

The invention more particularly concerns the read-out of such a kind of store with recourse to the well-known magneto-optical KERR effect: when a metallic magnetic surface which is magnetized along one direction in its own plane receives a beam of a linearly polarized light, the average orientation of which presents an incident angle other than zero and which is preferably of about 30° to 70° with the normal to the plane of the surface, it is seen that after analysis of the light reflected by the surface, the intensity of the analyzed light essentially depends upon the magnetization condition of the reflecting surface. When the magnetization is perpendicular to the incidence plane of the light beam, the KERR effect is said to be transverse; the effect is said to be longitudinal when the magnetization is in the incidence plane of the light beam. Said effects are only of maximum values for angles of incidence which vary from material to material but, generally, said maxima are centered around 50° to 60° from a plane normal to the plane of the material.

The reflected light is the subject at its reflection, of a rotation of the plane of polarization together with an elliptization which is due to the Kerr effect and also an elliptization which is due to the metallic reflection, often called the FRESNEL elliptization. The Fresnel elliptization is a parasitic phenomenon. Usually the Fresnel elliptization is nullified from an appropriate choice of the polarization plane of the light beam which is either parallel or perpendicular to the incidence plane of the beam on the surface. As concerns the Kerr longitudinal effect, a Kerr rotation of the plane, together with a small value Kerr elliptization effect is obtained for either one of the said directions of the plane of polarization. A typical value of such a rotation for metallic ferromagnetic materials is of the order of some minutes of arc. In the case of the Kerr transverse effect, only the plane of polarization which is parallel to the incidence plane of the light will produce an effect which is translated by a variation of the reflected light and depends upon the value of the magnetization. Under such conditions, the value of said Kerr transverse effect is of the order of 1 percent, which cannot lead to an easy utilization of said effect.

It is however possible to efficiently use the Kerr effect, whether longitudinal or transverse, by placing the plane of incidence of the beam at an angle other than 0° or 90° included means are provided for cancellation of the parasitic Fresnel elliptization which occurs at such angles. In order to reduce, if not eliminate the Fresnel effect, it has been proposed to have recourse to elliptization compensators, i.e., mirrors on which the linearly polarized light beam is the subject of a first reflection before falling on the magnetized surface to be "read out." In the case of a read out of a metallic ferromagnetic surface, D.E. DOVE proposed, in "Journal of Applied Physics", July 1963. pages 2067 et seq to ensure a first purely metallic reflection from a surface which has no magnetization but is of the same nature of material as the magnetized surface to be read. The perpendicular and parallel directions defined with respect to the incidence plane of the beam incident to the mirror are permutated at the next reflection on the magnetized surface, consequently ensuring a phase compensation between the two lights which are ellipticized by the two metallic reflections and finally, in the analyzed beam, such a phase compensation leaves only the Kerr ellipticity plus the Kerr rotation of the plane of polarization of the light. The elliptization compensation due to the metallic reflections is an optimum value for an angle neighboring 45° between the plane of polarization of the incident light and the incidence plane of said light.

An object of the invention is to obtain, for a high grade analyzer, an optimized contrast between the light intensities of the beam for memory points recording reversed information bits and the magnetization vectors are consequently aligned along two distinct directions, one of which is, in most cases, non-parallel to the other one.

According to a feature of the invention, the compensation mirror is made saturated in one of the direction of magnetization so that, for one of the directions of the magnetization in the storing layer, the reflected and analyzed light is linearly polarized. This is not the case for the other one of the magnetization direction of said layer, and consequently the response presents an optimum discrimination between the two states of magnetization in the storing layer surface. Such a response is electrically given from a light to current converter on which is directed the finally issuing light and which delivers the read-out signal to be used in the system comprising such a store and read-out arrangement.

According to a further feature of the invention, the magnetization of the compensating mirror is systematically oscillated from one condition of saturation to the other one and the read-out signal is applied to a phase detector supplied with the signal which controls said oscillation of conditions of saturation of the compensating mirror. It has been observed that in such a condition, the variation of the read out signal is in phase or in phase opposition with said control signal according to the direction of saturation of the memory point which reflects the light beam, so that the phase detection ensures an easy discrimination between the values "1" and "0" at the memory points; one of said digital values gives a zero output signal from said phase detector and the other one of said digital values gives an output signal of the phase detector which is different from zero. The "1" and "0" values are of course conventionally defined in this respect.

BRIEF DESCRIPTION OF THE DRAWINGS

These and further features will be fully detailed with reference to the accompanying drawings wherein.

Said examples of embodiment are only illustrative and any technological variations thereof remain within the scope of the invention as defined by the appended claims.

Figure 1:
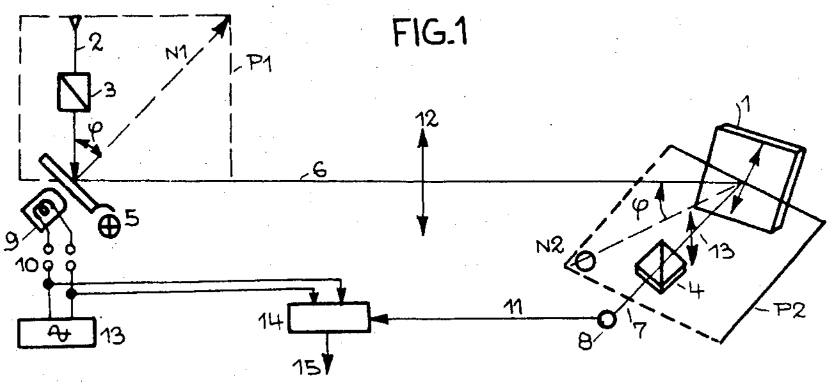
FIG. 1 shows the basic arrangement of a system according to the present invention.

With reference to FIG. 1, the memory point is shown at 1 and the compensating mirror is shown at 5 together with its saturating member supplied at 10 for ensuring the saturation of the magnetization of the mirror along a predetermined direction of orientation. Both 1 and 5 are made of a metallic ferromagnetic material. A coherent light beam 2, for instance and illustratively generated by a Laser source, is linearly polarized at 3 and impinges on the reflecting mirror 5 with an incidence angle $\phi$ with respect to the normal N1 to the plane of said mirror. N1 is in the incidence plane P1 of the beam. The reflected beam 6 is directed, through a focussing optics 12 if desired, to the memory member 1 upon which it impinges with the same incidence angle $\phi$ with respect to the normal N2 and is reflected in a plane P2 orthogonal to P1. Said new reflected beam, the subject of a refocussing action at 13 if needed, passes through an analyzer 4 of crossed direction with respect to the polarizer 3 and falls at 7 on an optoelectrical converter 8 which issues at 11 a signal the value of which depends upon the condition of magnetization of the memory member 1 and the response of the material of said member to the Kerr effect. Said signal does not comprise any term due to the metallic reflection of the member 1 since said reflection is compensated by the metallic reflection of the mirror 5. As said mirror 5 is made saturated in one condition of magnetization, the output signal at 11 is of a value which directly depends on the direction of the magnetization in the memory member 1 according to whether said magnetization is in one or the other of the two directions indicated by the twin arrows within the said memory member 1. For one of the directions, the reflected beam from the memory member presents a linear polarization and the value of its intensity at 7, after the analyzer 4 the transmission direction of which is set perpendicularly to the direction of the linear polarization, is consequently substantially zero ( the analyzer may have a certain degree of lack of extinction of such a light) and, in any case, is of a minimum value whereas for the other direction of the magnetization in 1, said beam is ellipticized and its value of intensity is maximum at 7.

Figure 5:
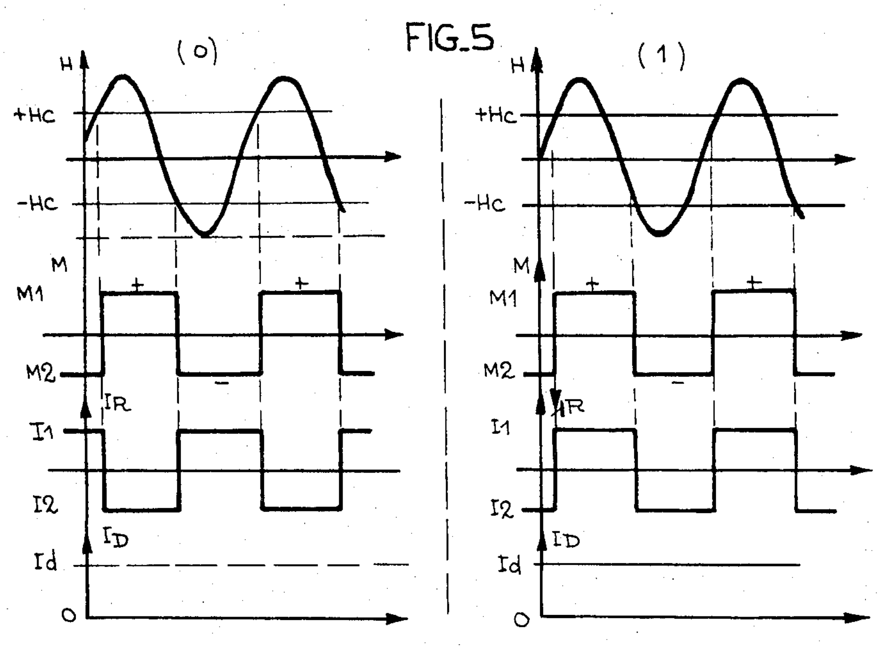
FIG. 5 shows diagrams used for partially explaining the operation of the systems in the preceding figures.

For setting the condition of the magnetization within the memory member 1, it is of special advantage to obtain an all to zero discrimination. In this respect, instead of maintaining a constant state of magnetization of the mirror 5, the magnetic head 9 is fed with an a.c. character voltage (not imperatively a sine-wave one) supplied from a generator 13 connected to the terminals 10 of the head 9. Said alternating voltage controls the magnetization M of the material of the mirror from one condition of saturation M1 to the other condition of saturation M2 and back, see FIG. 5, by applying thereto a variable magnetic field H which exceeds the coercive values +HC and −HC of the material of the mirror. The same alternating voltage is applied, as a phase reference voltage, on a phase detector circuit, otherwise conventional per se, the input signal of which is the signal issuing at 11 from the opto-electrical converter 8, a signal IR which varies from the positive value I1 to the negative value I2 which follows the variation of M from Mi to M2, in the following fashion: When for instance the magnetization of the memory member 1 is in its saturated condition representing a "0," the output signal IR appears in phase opposition with the variation of the magnetization in the mirror 5, consequently in phase opposition to the variation of the electrical voltage of the generator 13. The phase detector output at 15 will then issue a nul signal ID. When, on the other hand, the the magnetization of the memory member 1 is in its saturated condition representing a "1," the output signal IR appears in phase coincidence with the variation of the magnetization M of the mirror 5, consequently in phase coincidence to the variation of the electrical voltage of the generator 13. The phase detector output at 15 will then issue a signal ID which has a value Id. Consequently, the binary values "0" and "1" are duly discriminated at the read-out of the memory points of the memory member 1. The diagrams of FIG. 5 are shown for the transverse KERR effect.

Figure 2:
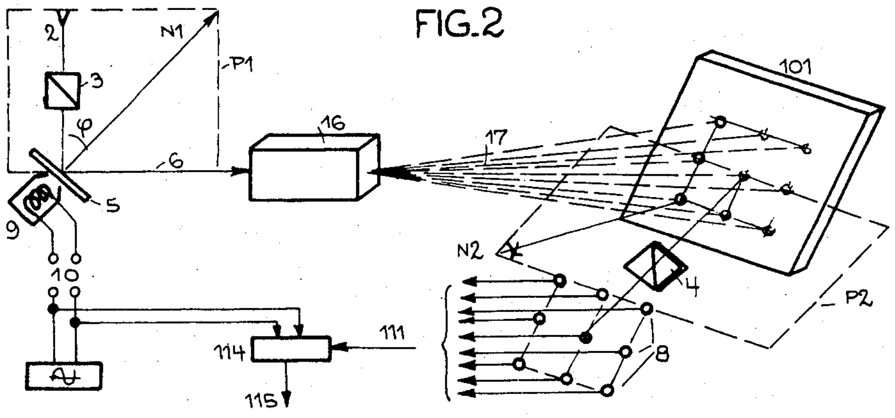
FIG. 2 shows an example of application of the invention to the read-out of a fixed magnetic store.

For a read out of a fixed memory plane 101, FIG. 2, the light beam 6 from the mirror 5 must be distributed on the memory points in the plane 101, as illustrated at 17. The reflected beams from these memory points are directed on to an equal number of opto-electrical converters 8 through analyzers 4. All the beams reflected from 101 may be directed through a single analyzer on a mosaic of opto-electrical converters through appropriate optics if desired. The mosaic may consist of a mosaic of photodiodes, quite similar for instance to those which are used in character recognition systems, and the outputs of the photodiodes 8 may be connected to the inputs of to an equal number of phase detector circuits 114 through connections such as 111. The outputs 115 of said detector circuits 114 will be signals representing, in the above explained conditions, the magnetization conditions of the memory points of 101.

The beam distribution device is only shown diagrammatically as a block 16 for sake of simplicity of the drawing. It may be made in accordance with varied and well-known arrangements, as for instance:

a. an optical arrangement including a plurality of lenses which, after an enlargement of the incoming beam 6, project on the plane 101 as many light spots as are adjacent lenses in 16; — such a device is usually known as a "fly eye,"
b. a system for deflecting a light beam according to two coordinate axes, made of electro-optical or electro-acoustical deflecting cells; — in such a case, it becomes possible, if desired, to address the cells from addressing electrical signals for scanning the memory plane in a sequential mode, so that a single opto-electrical converter 8 and a single phase detector 114 may be used for reading the content of the required part of the store 101.

From combinations of these fly-eye and deflection devices it will be obvious that any required combination of series-parallel readings may be provided.

Figure 3:
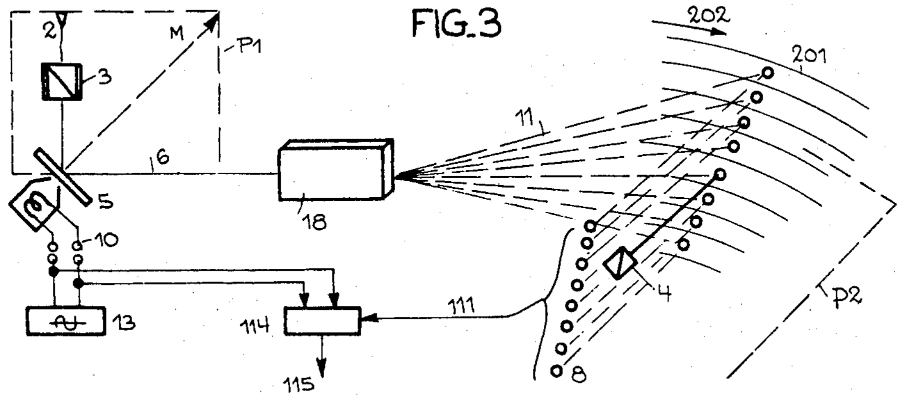
FIG. 3 shows an example of application of the invention to the read-out of a moving magnetic store.

However, the invention probably finds its most advantageous applications when applied in relation with moving magnetic carriers such as magnetic disks, magnetic drums, or magnetic tapes. The memory points are aligned along the moving tracks, as for instance shown in FIG. 3 for a magnetic disk 201 which rotates in the direction of the arrow 202. The figure only shows 8 tracks, (which number may be the actual one for a magnetic tape as known). The light beam 6 is distributed by a member 18 of the fly-eye kind for instance in as many secondary beams as there are tracks on the disk. Said secondary beams are coplanar and of substantially identical incidence angles at their contacts with the moving disk, the angle being the same as that of the polarized beam falling on the mirror 5. A column of photoreceivers such as photodiodes 8 receives the beams reflected from 201 and analyzed at 4. The signals issuing from these photoreceivers are processed as herein above explained.

Figure 4:
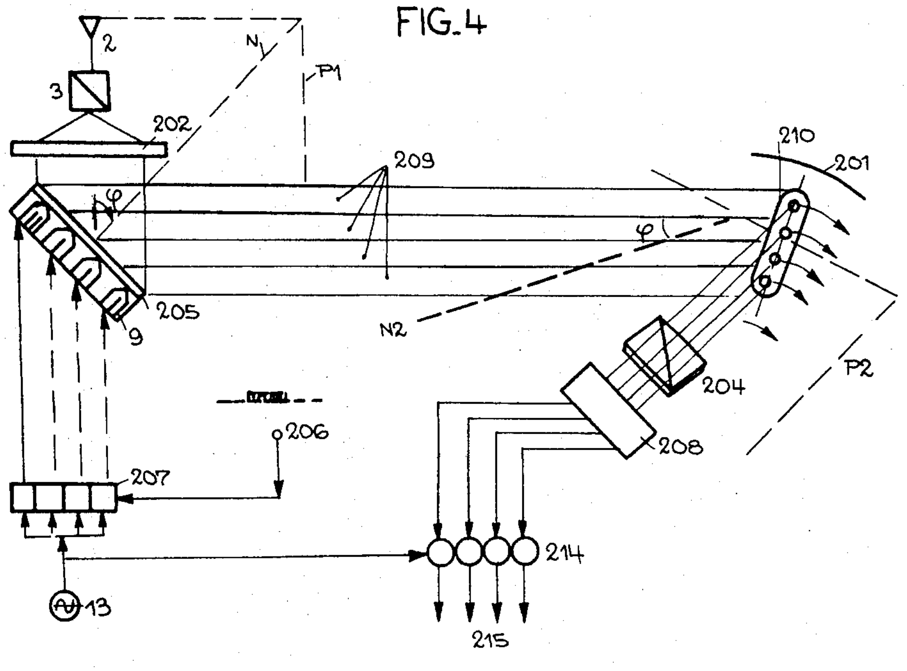
FIG. 4 shows a modification of the system of FIG. 3.

However it is simpler to apply the invention to the read out of moving tracks according to the system shown in FIG. 4. The mirror 205 in this embodiment is made with a useful area sufficiently wide for reflecting the incident light-beam from the polarizer 3 after its enlargement by optics 202 into a beam the cross-section of which is substantially as shown at 210 on the rotating disk 201 after reflection at 205, such an enlarged beam then covering a plurality of the tracks of the disk due to its radial span thereat. For the sake of simplicity, only four tracks are shown spanned over by said beam and, of course, in actual practice, there is a greater number of such tracks which cooperates with a single "flat" beam. A plurality of magnetization controlling heads 9 are associated with the mirror 205, as many as are tracks to be spanned over by the reflected beam on the disk. Actually, the reflected beam from the mirror must be considered as made of as many subsidiary beams 209, four in the concerned example. Each subsidiary beam is generated from the reflection of the overall incident beam on a portion of the mirror 205 which is distinctly activated from one of the modulation heads 9. Gates 207 connect the output of the alternating voltage generator 13 to the various heads 9. The subsidiary beams reflected by 201 are analyzed at 204 and the analyzed beams fall on a bank of electro-optical members 208 such as photodiodes for instance as previously explained. The outputs of the members 208 are applied to an equal number of inputs of detector circuits 214 each of which receives the voltage from 13 as a reference phase voltage. The outputs of said detector circuits are shown at 215.

A control input 206 is shown for controlling the gates 207. Such a control may be understood as enabling any desired selection of the heads 9 by unblocking the gates according to any desired combination: when, for instance, the four tracks must be simultaneously read, the four gates 207 must obviously be all unblocked; when on the other hand, a single track must be read, a single gate must be correspondingly unblocked; and so forth. It must consequently be considered that the read out system is an addressable one from the programmes of the computer or of the information processing system in which the equipment is connected. Addressing may be made by providing as many individual connections 206 as there are outputs of a decoder circuit of an address of a gate 207.

Extension of FIG. 4 to a number of tracks neighboring the actual practice of the kind of stores such as a magnetic disk may be explained as follows: considering for instance a disk presenting 32 tracks, with an elementary "word" comprising eight binary bits (an "octet") recorded on adjacent tracks of the disk. Such a division of the light beam into four "bands" as shown enables the definition of four groups of tracks, each including eight adjacent tracks. It suffices to consider that each band such as shown spans over eight tracks instead of one, so that the column 208 includes 32 photoreceiver members, distributed by their outputs on eight phase detector circuits, in correspondance of the ranks of the receivers in the four groups. A selection at 206 of a gate 207 will ensure the selection of a group of eight consecutive tracks on the disk, i.e., the selection of one serially read-out series of words, each word defined by the octet read-out from the said tracks.

In both a track-by-track or a group-by-group selection, not only is such a selection made from the gates 207 but, when desired, a corresponding number of gates may be provided at the outputs of the photoreceivers and simultaneously controlled by the gates 207. This reduces to unity the necessary number of the phase detector circuits 214 in the case of a track-by-track selection and to a number of phase detectors equal to the number of groups of tracks in the case of a group-by-group selection at 206.

The reduction to practice of the invention produces, in addition to the above explained advantages, the advantage of an important increase of the signal to noise ratio. As has been said, the KERR effect is of small value in the usual metallic ferromagnetic materials of the stores and, further, any information carrier having a coating made of a metallic ferromagnetic material may present such defects as scratches, dust particles and varied other deleterious deposits. Such defects partially de-polarize the reflected light, at least to some extent of and consequently apply undue decreases to the signal-to-noise ratio with respect to the value expected from the theoretical KERR effect. Further, in conventional read-out systems based on the magneto-optics, it is important that the light source presents a high degree of stability and, when such a stability is not present, the signal-to-noise ratio is further reduced. A light source of the Laser kind, while of advantage in various respects, usually lacks light stability. As, the invention, the information is, after the analyzer, carried in the phase of the light modulated signal, not in the amplitude thereof, it is possible to extract such information, as described, by means of a phase detection process. The detector circuits may be easily made with a narrow bandwith centered on the modulation frequency so as to be as close as possible to a true synchronous detection effect. As the noise due to the above defined reasons does not present any definite relation with the phase of the modulation, such noise is substantially eliminated.

What is claimed is:

1. A Kerr effect read-out system, for reading binary data magnetically recorded on a metallic ferromagnetic layer, comprising in combination;

a source of linearly polarized light;

means including a ferromagnetic metallic mirror for directing said light on to the layer in which the data to be read out are recorded;

conversion means for deriving signals proportional to the intensity of light reflected from said layer; and means for magnetically saturating said mirror along a predetermined direction.

2. A Kerr effect read-out system as defined by claim 1 wherein said mirror material saturating means includes means for modulating the magnetization by oscillating it between reverse conditions of saturation and wherein a synchronous phase detector means is connected to receive both the electric signal derived from the light reflected from the layer after analysis thereof and the electric signal controlling the said magnetization modulation of said mirror material magnetic saturating means.

3. A Kerr effect read-out system as defined by claim 2 wherein said modulating means is arranged to control simultaneously the magnetization of all the material of said mirror.

4. A Kerr effect read-out system as defined by claim 2 wherein said modulating means is arranged to control the magnetization of the material of said mirror in predetermined portions in step-by-step fashion.

5. A Kerr effect read-out system as defined by claim 2 in which the recording layer is fixed with respect to the light reflected from said mirror and in which means are inserted between said mirror and the layer for distributing the light reflected by the mirror on said layer in as many secondary light beams as there are memory points in the layer and in which said conversion means is a mosaic of photo responsive elements.

6. A Kerr effect read-out system as defined by claims wherein each one of said secondary light beams is of such size as to span over a plurality of memory points in the layer.

7. A Kerr effect read-out system as defined by claim 5 wherein said light distributing means includes means for scanning the recording layer with said secondary beams.

8. A Kerr effect read-out system as defined by claim 2 wherein the recording layer has multiple information recording tracks movable within the incidence plane of light reflected from said mirror said system including means inserted between said mirror and the moving layer for forming and directing on the layer a plurality of secondary light beams a number of which is related to the number and grouping relation of the information recording tracks, and at least one column of photo responsive conversion elements positioned to receive the light from said secondary beams following reflection from the layer and analysis thereof.

9. A Kerr effect read-out system as defined by claim 8 wherein each one of such secondary light beams is formed by reflection of part of the primary linearly polarized beams on a portion of said mirror controlled by a portion of said magnetization modulating means distinctly activated with respect to other portions magnetizing other portions of said mirror.

10. A Kerr effect read-out system as defined by claim 9 wherein said synchronous detector circuit means comprise as many phase detector circuits as there are recording tracts spanned over by each one of said secondary light beams and means selectively connecting said phase detector circuits to the outputs of groups of photo responsive conversion elements positioned to receive light from said secondary beams after reflection from the tracks and analysis thereof, in accordance with selective magnetization of portions of said reflecting mirror.

11. A Kerr effect read-out system as defined by claim 9 including means for shaping the cross section of the light beam incident to said mirror in an elongated transverse direction area and in which said mirror is also of an elongated area for reflecting said light beam with varied modulations thereof from varied magnetizations of corresponding parts in said mirror.

* * * * *